US010392946B2

(12) United States Patent
Freeman et al.

(10) Patent No.: US 10,392,946 B2
(45) Date of Patent: Aug. 27, 2019

(54) TURBINE BLADE WITH REINFORCED PLATFORM FOR COMPOSITE MATERIAL CONSTRUCTION

(71) Applicants: Rolls-Royce North American Technologies, Inc., Indianapolis, IN (US); Rolls-Royce Corporation, Indianapolis, IN (US)

(72) Inventors: Ted J. Freeman, Danville, IN (US); Jay E. Lane, Mooresville, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 278 days.

(21) Appl. No.: 15/386,898

(22) Filed: Dec. 21, 2016

(65) Prior Publication Data

US 2018/0171805 A1 Jun. 21, 2018

(51) Int. Cl.
*F01D 5/28* (2006.01)
*F01D 5/30* (2006.01)

(52) U.S. Cl.
CPC ............. *F01D 5/282* (2013.01); *F01D 5/284* (2013.01); *F01D 5/3007* (2013.01);
(Continued)

(58) Field of Classification Search
CPC ........ F01D 5/282; F01D 5/3084; F01D 5/284; F01D 5/3007; F05D 2300/6034
See application file for complete search history.

(56) References Cited

U.S. PATENT DOCUMENTS 4,639,388 A * 1/1987 Ainsworth .............. B32B 15/04 428/117
6,197,424 B1 * 3/2001 Morrison .............. C04B 28/344 416/241 B (Continued)

FOREIGN PATENT DOCUMENTS

EP 2365186 A2 9/2011
EP 2540965 A2 1/2013

(Continued)

OTHER PUBLICATIONS

Chen et al., Composites: Part A, Mar. 9, 2016, Elsevier Ltd., Intoduction (Year: 2016).*

(Continued)

*Primary Examiner* — Nathaniel E Wiehe
*Assistant Examiner* — Andrew J Marien
(74) *Attorney, Agent, or Firm* — Barnes & Thornburg LLP

(57) ABSTRACT

A turbine blade of ceramic matrix composite material construction adapted for use in a gas turbine engine is disclosed. The turbine blade includes a root, an airfoil, and a platform. The root is adapted to attach the turbine blade to a disk. The airfoil is shaped to interact with hot gasses moving through the gas path of a gas turbine engine and cause rotation of the turbine blade when the turbine blade is used in a gas turbine engine. The platform has an attachment side facing the root and a gas path side facing the airfoil. The platform is arranged between the root and the airfoil and shaped to extend outwardly from the root and the airfoil in order to block migration of gasses from the gas path toward the root when the turbine blade is used in a gas turbine engine.

19 Claims, 2 Drawing Sheets

(52) U.S. Cl.
CPC ........ *F01D 5/3084* (2013.01); *F05D 2220/32* (2013.01); *F05D 2240/30* (2013.01); *F05D 2240/80* (2013.01); *F05D 2300/6033* (2013.01); *F05D 2300/6034* (2013.01); *F05D 2300/614* (2013.01); *Y02T 50/672* (2013.01); *Y02T 50/673* (2013.01)

(56) References Cited

U.S. PATENT DOCUMENTS 6,676,783 B1 * 1/2004 Merrill .................... C04B 28/34 156/89.11
6,893,750 B2 * 5/2005 Nagaraj ................ C23C 28/321 416/241 B
7,549,840 B2 * 6/2009 Subramanian ........ C04B 35/573 29/889.2
8,607,454 B2 * 12/2013 Blanchard ............... B29C 70/24 29/889.21
8,715,809 B2 5/2014 Ravey
9,421,733 B2 * 8/2016 Uskert ...................... B32B 5/18
10,046,482 B2 * 8/2018 Marsal ............... B29D 99/0025
2011/0217166 A1 * 9/2011 McMillan ............... F01D 5/147 415/229
2013/0004326 A1 * 1/2013 McCaffrey .............. F01D 5/147 416/241 B
2014/0271208 A1 * 9/2014 Garcia-Crespo .......... F01D 5/30 416/194
2014/0349538 A1 * 11/2014 Marchal .................. B29C 70/24 442/206
2016/0230568 A1 * 8/2016 Sippel ..................... F01D 9/041
2016/0245103 A1 * 8/2016 Gimat ..................... B29B 11/16
2016/0356163 A1 * 12/2016 Freeman ................. F01D 5/282
2017/0058912 A1 * 3/2017 De Gaillard ............ B29B 11/16
2017/0298745 A1 * 10/2017 Freeman ................. F01D 5/147
2018/0230823 A1 * 8/2018 Sippel ..................... F01D 5/282

FOREIGN PATENT DOCUMENTS

WO 2013/088040 A2 6/2013
WO 2015/080781 A2 6/2015

OTHER PUBLICATIONS

Extended EP Search Report completed on May 7, 2018 and issued in connection with European Patent Application No. 17206692.0.

* cited by examiner

TURBINE BLADE WITH REINFORCED PLATFORM FOR COMPOSITE MATERIAL CONSTRUCTION

FIELD OF THE DISCLOSURE

The present disclosure relates generally to turbine blades, and more specifically to turbine blades with composite material construction.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Blades of the turbine interact with products of the combustion reaction in the combustor such that the combustion reaction products heat the blades and cause them to experience very high temperatures. The blades are often made from high-temperature compatible materials such as composite materials and are sometimes actively cooled by supplying air to the blades. Design and manufacture of blades from composite materials remains an area of interest.

SUMMARY

The present disclosure may comprise one or more of the following features and combinations thereof.

According to one aspect of the present disclosure, a turbine blade of ceramic matrix composite material construction adapted for use in a gas turbine engine may include a root, an airfoil, and a platform. The root may be adapted to attach the turbine blade to a disk. The airfoil may be shaped to interact with hot gasses moving through the gas path of a gas turbine engine and cause rotation of the turbine blade when the turbine blade is used in a gas turbine engine. The platform may have an attachment side facing the root and a gas path side facing the airfoil, and the platform may be arranged between the root and the airfoil and shaped to extend outwardly from the root and the airfoil in order to block migration of gasses from the gas path toward the root when the turbine blade is used in a gas turbine engine. The turbine blade may include at least one attachment fiber-reinforcement ply, at least one gas path fiber-reinforcement ply, and at least one through thickness reinforcement. The at least one attachment fiber-reinforcement ply may form part of the root and extend generally in a first direction to form part of the attachment side of the platform. The at least one gas path fiber-reinforcement ply may form part of the airfoil and extend generally in the first direction to form part of the gas path side of the platform. The at least one through thickness reinforcement may extend generally in a second direction perpendicular to the first direction from the attachment side of the platform to the gas path side of the platform to secure the at least one attachment fiber-reinforcement ply to the at least one gas path fiber-reinforcement ply to facilitate resistance to loads induced on the platform when the turbine blade is used in a gas turbine engine.

In some embodiments, the at least one through thickness reinforcement may include a plurality of through thickness pins. Additionally, in some embodiments, the number of attachment fiber-reinforcement plies may be substantially equal to the number of gas path fiber-reinforcement plies.

In some embodiments, the at least one through thickness reinforcement may include through thickness fibers interwoven with the at least one attachment fiber-reinforcement ply and the at least one gas path fiber-reinforcement ply. The through thickness fibers may be stitched to the at least one attachment fiber-reinforcement ply and the at least one gas path fiber-reinforcement ply such that the through thickness fibers extend generally in the second direction. Additionally, in some embodiments, the through thickness fibers may be punched to the at least one attachment fiber-reinforcement ply and the at least one gas path fiber-reinforcement ply such that the through thickness fibers extend generally in the second direction. Further, in some embodiments, the through thickness fibers are be manually tied to the at least one attachment fiber-reinforcement ply and the at least one gas path fiber-reinforcement ply such that the through thickness fibers extend generally in the second direction. The through thickness fibers may include monofilament ceramic fibers. The monofilament ceramic fibers may include SCS-Ultra silicon carbide fibers or SCS-6 silicon carbide fibers.

According to another aspect of the present disclosure, a turbine blade may include a root, an airfoil, and a platform. The root may be adapted to attach the turbine blade to a disk. The airfoil may be aerodynamically shaped to interact with gasses. The platform may have an attachment side facing the root and a gas path side facing the airfoil, and the platform may be arranged between the root and the airfoil and shaped to extend outwardly from the root and the airfoil. The turbine blade may include at least one attachment reinforcement component comprising ceramic-containing materials and at least one gas path reinforcement component comprising ceramic-containing materials. The at least one attachment reinforcement component may be located at least in part at the attachment side of the platform and form part of the root. The at least one gas path reinforcement component may be located at least in part at the gas path side of the platform and form part of the airfoil. The at least one attachment reinforcement component and the at least one gas path reinforcement component may be three-dimensional woven structures.

In some embodiments, the turbine blade may further include at least one through thickness reinforcement extending generally perpendicular to each of the at least one attachment reinforcement component and the at least one gas path reinforcement component between the attachment and gas path sides of the platform to secure the at least one attachment reinforcement component to the at least one gas path reinforcement component. The at least one through thickness reinforcement may include through thickness fibers stitched to the at least one attachment reinforcement component and the at least one gas path reinforcement component. Additionally, in some embodiments, the at least one through thickness reinforcement may include a plurality of through thickness pins.

In some embodiments, the turbine blade may further include core fiber-reinforcement plies that form part of the root and the airfoil without forming part of the platform. The core fiber-reinforcement plies may be made from two-dimensional woven fabrics. The turbine may further include at least one through thickness reinforcement extending generally perpendicular to the at least one gas path reinforcement component and the core fiber-reinforcement plies through the airfoil to secure the at least one gas path reinforcement component to the core fiber-reinforcement plies. The at least one through thickness reinforcement may include through thickness fibers stitched to the at least one gas path reinforcement component and the core fiber-reinforcement plies.

According to yet another aspect of the present disclosure, a turbine blade may include a root, an airfoil, and a platform. The root may be adapted to attach the turbine blade to a disk. The airfoil may be aerodynamically shaped to interact with gasses. The platform may have an attachment side facing the root and a gas path side facing the airfoil, and the platform may be arranged between the root and the airfoil and shaped to extend outwardly from the root and the airfoil. The turbine blade may include at least one attachment reinforcement component comprising ceramic-containing materials, at least one gas path reinforcement component comprising ceramic-containing materials, and at least one through thickness reinforcement. The at least one attachment reinforcement component may be located at least in part at the attachment side of the platform and forms part of the root. The at least one gas path reinforcement component may be located at least in part at the gas path side of the platform and forms part of the airfoil. The at least one through thickness reinforcement may extend generally perpendicular to each of the at least one attachment reinforcement component and the at least one gas path reinforcement component through the platform to secure the at least one attachment reinforcement component to the at least one gas path reinforcement component.

In some embodiments, the at least one attachment reinforcement component may include attachment fiber-reinforcement plies made from two-dimensional woven fabrics. The at least one gas path reinforcement component may include gas path fiber-reinforcement plies made from two-dimensional woven fabrics.

In some embodiments, the at least one attachment reinforcement component may be a three-dimensional woven structure. The at least one gas path reinforcement component may be a three-dimensional woven structure.

These and other features of the present disclosure will become more apparent from the following description of the illustrative embodiments.

DETAILED DESCRIPTION OF THE DRAWINGS

Figure 1:
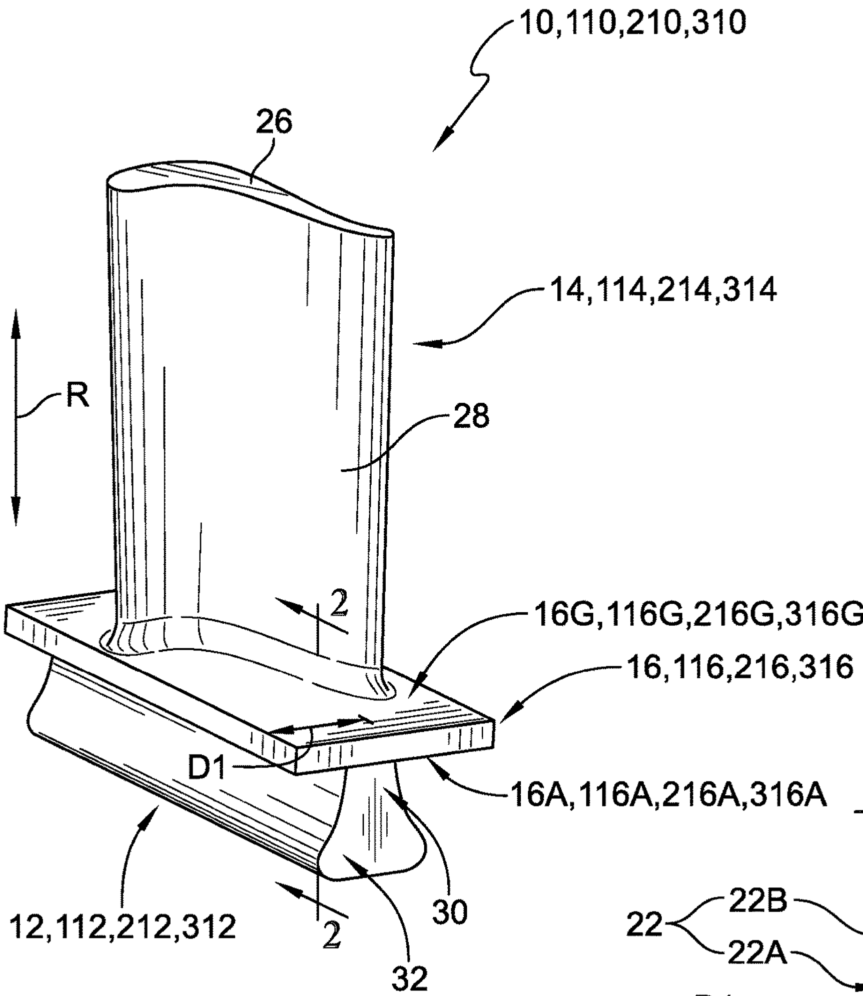
FIG. 1 is a perspective view of a turbine blade of ceramic matrix composite material construction, the turbine blade including a root adapted to attach the turbine blade to a disk, an airfoil shaped to interact with hot gasses in a turbine engine flow path, and a platform that separates the root from the airfoil such that hot gasses from the turbine engine flow path are blocked from the attachment of the root to the disk.

For the purposes of promoting an understanding of the principles of the disclosure, reference will now be made to a number of illustrative embodiments illustrated in the drawings and specific language will be used to describe the same.

Referring now to FIG. 1, an illustrative turbine blade 10 adapted for use in a gas turbine engine is constructed of ceramic matrix composite material (CMC). The turbine blade 10 includes a root 12, an airfoil 14, and a platform 16. The root 12 is adapted to attach the turbine blade 10 to a disk within the gas turbine engine. The airfoil 14 extends away from the root 12 and the platform 16 in a radial direction indicated by arrow R and is shaped to interact with hot gasses moving through the gas path of the gas turbine engine. Interaction of the airfoil 14 with the hot gasses causes rotation of the turbine blade 10 about a central axis when the blade 10 is used in a gas turbine engine. The platform 16 is arranged between the root 12 and the airfoil 14 and shaped to extend outwardly from the root 12 and the airfoil 14 in order to block migration of gasses from the gas path toward the root 12 when the blade 10 is used in a gas turbine engine. The platform 16 has an attachment side 16A facing the root 12 and a gas path side 16G facing the airfoil 14.

Figure 2:
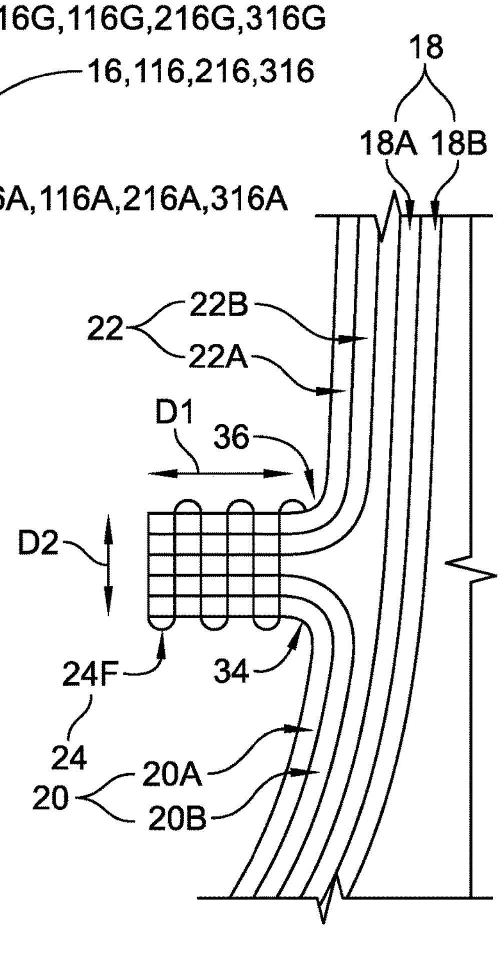
FIG. 2 is a partial cross-sectional view of the turbine blade of FIG. 1 showing that the turbine blade includes at least one attachment fiber-reinforcement ply that forms part of the root and an attachment side of the platform, at least one gas path fiber-reinforcement ply that forms part of the airfoil and a gas path side of the platform, and at least one through thickness reinforcement extending from the attachment side of the platform to the gas path side of the platform to secure the at least one attachment fiber-reinforcement ply to the at least one gas path fiber-reinforcement ply.

In the illustrative embodiment, the root 12, the airfoil 14, and the platform 16 are formed using core fiber-reinforcement plies 18, at least one attachment fiber-reinforcement ply or attachment reinforcement component 20, at least one gas path fiber-reinforcement ply or gas path reinforcement component 22, and at least one through thickness reinforcement 24 as shown in FIG. 2. The core fiber-reinforcement plies 18 are disposed centrally within the turbine blade 10 to a provide a body 26 of the blade 10. The at least one attachment fiber-reinforcement ply 20 forms part of the root 12 and extends generally in a direction D1 to form part of the attachment side 16A of the platform 16. The at least one gas path fiber-reinforcement ply 22 forms part of the airfoil 14 (e.g., a gas path surface 28 of the airfoil 14) and extends generally in the direction D1 to form part of the gas path side 16G of the platform 16. The at least one through thickness reinforcement 24 extends generally in a direction D2 perpendicular to the direction D1 from the attachment side 16A to the gas path side 16G to secure the at least one attachment fiber-reinforcement ply 20 to the at least one gas path fiber-reinforcement ply 22. As a result, the at least one through thickness reinforcement 24 facilitates resistance to loads induced on the platform 16 when the turbine blade 10 is used in a gas turbine engine.

In the illustrative embodiment, the ceramic matrix composite material used to make the turbine blade 10 includes silicon-carbide fibers in a silicon-carbide matrix. The core fiber-reinforcement plies 18, the at least one attachment fiber-reinforcement ply 20, the at least one gas path fiber-reinforcement ply 22, and the at least one through thickness reinforcement 24 may be co-processed in matrix material. In other embodiments, however, the turbine blade 10 may be constructed of other suitable composite materials depending on application.

Designs in accordance with the present disclosure incorporate at least one attachment fiber-reinforcement ply 20 providing portions of both the root 12 and the platform 16 and at least one gas path fiber-reinforcement ply 22 providing portions of both the airfoil 14 and the platform 16 as shown in FIG. 2. Additionally, such designs incorporate at least one through thickness reinforcement 24 to secure the plies 20, 22 to one another. These designs directly tie the platform 16 into both the root 12 and the airfoil 14 to reinforce the platform 16. Consequently, forces applied to the platform 16 may be directly transferred to the root 12 and/or the airfoil 14 without being transferred over interfaces that may not be as strong as the plies themselves.

Referring again to FIG. 1, the illustrative root 12 extends radially inward from the platform 16 and flares outward to form a dovetail shape that can anchor the turbine blade 10 into a turbine disk of a gas turbine engine. In other embodiments, however, the root 12 may have another suitable shape such as a C-shape, a fir tree shape, or the like. The root 12 includes a shank section 30 and an attachment section 32. The shank section 30 is interconnected with the platform 16 and extends radially inward from the platform 16. The attachment section 32 is interconnected with the shank section 30 and extends radially inward of the section 30 before flaring outward to define the dovetail shape of the root 12.

The illustrative airfoil 14 extends radially outward from the platform 16 and is formed with a curvature suitable to interact aerodynamically with the gas flow produced by the gas turbine engine as shown in FIG. 1. The airfoil 14 is integrally formed with the root 12 and the platform 16 so that the platform 16 extends outward in the direction D1 from the root 12 and the airfoil 14.

The illustrative platform 16 forms a boundary between hot gasses passed radially outward of the gas path side 16G and cooler components located radially inward of the attachment side 16A as shown in FIG. 1. The platform 16 maintains the survivability of the components radially inward of the attachment side 16A by blocking the migration of gasses from the gas path. To that end, integral forming of the platform 16 with the root 12 and the airfoil 14 reduces the migration of gasses between the gas path and the cooler components radially inward of the platform 16.

Referring again to FIG. 2, the illustrative core fiber-reinforcement plies 18 are arranged internal to the turbine blade 10 and extend from the root 12, past the platform 16, and through the airfoil 14. The core fiber-reinforcement plies 18 are configured to define the curvature of the airfoil 14 and provide central support for the airfoil 14 during operation of the gas turbine engine. The core fiber-reinforcement plies 18 form part of the root 12 and the airfoil 14 without forming part of the platform 16.

In the illustrative embodiment, the core fiber-reinforcement plies 18 include two core fiber-reinforcement plies 18A, 18B as shown in FIG. 2. The core fiber-reinforcement plies 18A, 18B may be embodied as, or otherwise made from, two-dimensional woven fabrics. In other embodiments, the core fiber-reinforcement plies 18A, 18B may be embodied as, or otherwise made from, three-dimensional woven structures. In other embodiments still, the core fiber-reinforcement plies 18A, 18B may be embodied as, or otherwise made from, unidirectional monofilaments. In any case, another suitable number of core fiber-reinforcement plies 18 made from other suitable sheets of reinforcement may be employed.

In the illustrative embodiment, the at least one attachment fiber-reinforcement ply 20 includes two attachment fiber-reinforcement plies 20A, 20B as shown in FIG. 2. The attachment fiber-reinforcement ply 20A is located at least in part at the attachment side 16A of the platform 16 to partially define the side 16A along with a blade transitional bend 34 defined between the root 12 and the platform 16. The attachment fiber-reinforcement ply 20B is located internal to the ply 20A. In the illustrative embodiment, the attachment fiber-reinforcement plies 20A, 20B are made from two-dimensional woven fabrics. In other embodiments, however, another suitable number of attachment fiber-reinforcement plies 20 made from other suitable sheets of reinforcement may be employed.

In the illustrative embodiment, the at least one gas path fiber-reinforcement ply 22 includes two gas path fiber-reinforcement plies 22A, 22B as shown in FIG. 2. The gas path fiber-reinforcement ply 22A is located at least in part at the gas path side 16G of the platform 16 to partially define the side 16G along with a blade transitional bend 36 defined between the airfoil 14 and the platform 16. The gas path fiber-reinforcement ply 22B is located internal to the ply 22A. In the illustrative embodiment, the gas path fiber-reinforcement plies 22A, 22B are made from two-dimensional woven fabrics. In other embodiments, however, another suitable number of gas path fiber-reinforcement plies 22 made from other suitable sheets of reinforcement may be employed.

In the illustrative embodiment, the at least one through thickness reinforcement 24 includes through thickness fibers 24F interwoven with the attachment fiber-reinforcement plies 20A, 20B and the gas path fiber-reinforcement plies 22A, 22B as shown in FIG. 2. Specifically, the through thickness fibers 24F are interwoven with the portions of the plies 20A, 20B, 22A, 22B extending generally in the direction D1 such that the fibers 24F extend generally in the direction D2.

The through thickness fibers 24F may be interweaved with the attachment fiber-reinforcement plies 20A, 20B and the gas path fiber-reinforcement plies 22A, 22B as shown in FIG. 2 by a number of techniques. In one example, the through thickness fibers 24F may be stitched to the plies 20A, 20B, 22A, 22B such that the fibers 24F extend generally in the direction D2. In that case, one or more individual fiber tows placed in a predetermined orientation, loose fibers, multiple tows grouped through twisting or other means, and/or interleaved individual plies made up of fibers may be stitched through the platform 16. In another example, the through thickness fibers 24F may be punched to the plies 20A, 20B, 22A, 22B such that the fibers 24F extend generally in the direction D2. In yet another example, the through thickness fibers 24F may be manually tied to the plies 20A, 20B, 22A, 22B such that the fibers 24F extend generally in the direction D2. In that case, the through thickness fibers 24F may be embodied as, or otherwise include, monofilament ceramic fibers. For instance, the through thickness fibers 24F may be embodied as, or otherwise include, monofilament ceramic fibers such as SCS-Ultra silicon carbide fibers or SCS-6 silicon carbide fibers. In yet another example still, the through thickness fibers 24F may be tied to the plies 20A, 20B, 22A, 22B by an automated technique.

During operation of the gas turbine engine, coupling of the attachment fiber-reinforcement plies 20A, 20B to the gas path fiber-reinforcement plies 22A, 22B by the through thickness reinforcement 24 facilitates resistance to loads induced on the platform 16 as indicated above. When the turbine blade 10 rotates, centrifugal forces associated with interaction between the gas path gasses and the airfoil 14 may cause bending stresses to be induced on the blade 10. For example, such bending stresses may be induced on the platform 16 adjacent the blade transitional bends 34, 36. The coupling of the plies 20A, 20B to the plies 22A, 22B by the through thickness reinforcement 24 largely transfers those bending stresses to the root 12 and/or the airfoil 14 without causing interlaminar transfer of shear forces between the plies 20A, 20B and/or the plies 22A, 22B. By minimizing shear forces between plies, the life of the turbine blade 10 is increased.

Figure 3:
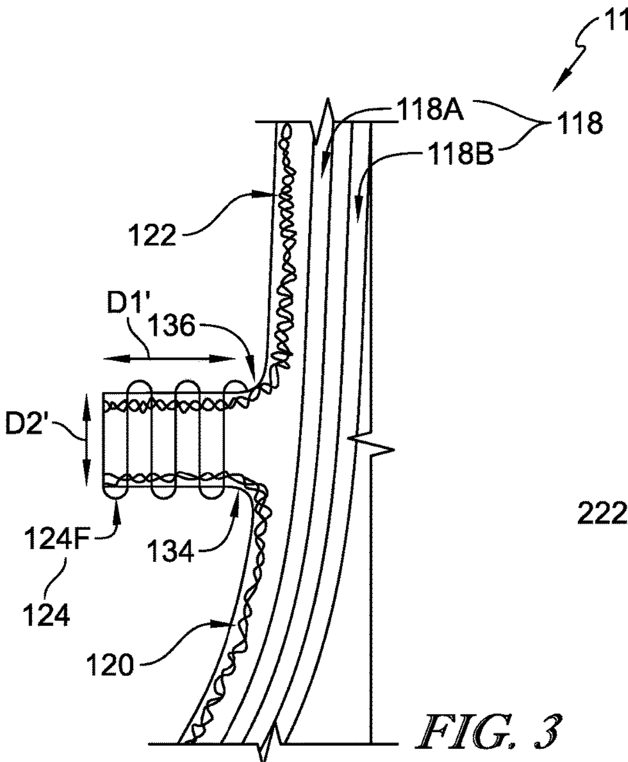
FIG. 3 is a partial cross-sectional view of another turbine blade similar to the turbine blade of FIG. 1 showing that the turbine blade includes at least one attachment reinforcement component that is a three-dimensional woven structure forming part of a root of the blade and an attachment side of a platform of the blade, at least one gas path reinforcement component that is a three-dimensional woven structure forming part of an airfoil of the blade and a gas path side of the platform, and at least one through thickness reinforcement extending from the attachment side of the platform to the gas path side of the platform to secure the at least one attachment reinforcement component to the at least one gas path reinforcement component.

Referring now to FIG. 3, another turbine blade 110 adapted for use in a gas turbine engine is constructed of ceramic matrix composite material. The turbine blade 110 is similar to the turbine blade 10 in that the turbine blade 110 includes a root 112, an airfoil 114, and a platform 116 similar to the root 12, the airfoil 14, and the platform 16 of the blade 10. As such, similar features are designated in FIG. 1 with numerals corresponding to each of the blades 10, 110.

The root 112, the airfoil 114, and the platform 116 are illustratively formed using core fiber-reinforcement plies 118, at least one attachment reinforcement component 120 having ceramic-containing materials, at least one gas path reinforcement component 122 separate from the component 120 having ceramic-containing materials, and at least one through thickness reinforcement 124 as shown in FIG. 3. The core fiber-reinforcement plies 118 are disposed centrally within the turbine blade 110. The at least one attachment reinforcement component 120 is located at least in part at an attachment side 116A of the platform 116 facing the root 112 and forms part of the root 112. The at least one gas path reinforcement component 122 is located at least in part at a gas path side 116G of the platform 116 facing the airfoil 114 and forms part of the airfoil 114. The at least one through thickness reinforcement 124 extends generally perpendicular to each of the components 120, 122 between the attachment and gas path sides 116A, 116G to secure the components 120, 122 to one another.

In the illustrative embodiment, the ceramic matrix composite material used to make the turbine blade 110 includes silicon-carbide fibers in a silicon-carbide matrix. The core fiber-reinforcement plies 118, the at least one attachment reinforcement component 120, the at least one gas path reinforcement component 122, and the at least one through thickness reinforcement 124 may be co-processed in matrix material. In other embodiments, however, the turbine blade 110 may be constructed of other suitable composite materials depending on application.

Designs in accordance with the present disclosure incorporate at least one attachment reinforcement component 120 providing portions of both the root 112 and the platform 116 and at least one gas path reinforcement component 122 providing portions of both the airfoil 114 and the platform 116 as shown in FIGS. 1 and 3. Additionally, such designs incorporate at least one through thickness reinforcement 124 to secure the components 120, 122 to one another. These designs directly tie the platform 116 into both the root 112 and the airfoil 114 to reinforce the platform 116.

The illustrative core fiber-reinforcement plies 118 are arranged internal to the turbine blade 110 and extend from the root 112, past the platform 116, and through the airfoil 114 as shown in FIGS. 1 and 3. The core fiber-reinforcement plies 118 are configured to define the curvature of the airfoil 114 and provide central support for the airfoil 114 during operation of the gas turbine engine. The core fiber-reinforcement plies 118 form part of the root 112 and the airfoil 114 without forming part of the platform 116.

In the illustrative embodiment, the core fiber-reinforcement plies 118 include two core fiber-reinforcement plies 118A, 118B as shown in FIG. 3. In some embodiments, the core fiber-reinforcement plies 118A, 118B may be embodied as, or otherwise made from, two-dimensional woven fabrics. In other embodiments, the core fiber-reinforcement plies 118A, 118B may be embodied as, or otherwise made from, three-dimensional woven structures. In other embodiments still, the core fiber-reinforcement plies 118A, 118B may be embodied as, or otherwise made from, unidirectional monofilaments. In any case, another suitable number of core fiber-reinforcement plies 118 made from other suitable sheets of reinforcement may be employed.

In the illustrative embodiment, the at least one attachment reinforcement component 120 is embodied as, or otherwise includes, at least one three-dimensional woven structure 120A as shown in FIG. 3. The at least one attachment reinforcement component 120 is located at least in part at the attachment side 116A of the platform 116 to partially define the side 116A along with a blade transitional bend 134 defined between the root 112 and the platform 116.

In the illustrative embodiment, the at least one gas path reinforcement component 122 is embodied as, or otherwise includes, at least one three-dimensional woven structure 122A as shown in FIG. 3. The at least one gas path reinforcement component 122 is located at least in part at the gas path side 116G of the platform 116 to partially define the side 116G along with a blade transitional bend 136 defined between the root 112 and the platform 116.

In the illustrative embodiment, the at least one through thickness reinforcement 124 includes through thickness fibers 124F interwoven with the at least one attachment reinforcement component 120 and the at least one gas path reinforcement component 122 as shown in FIG. 3. Specifically, the through thickness fibers 124F are interwoven with the portions of the components 120, 122 extending generally in a direction D1' such that the fibers 124F extend generally in a direction D2' perpendicular to the direction D1'.

The through thickness fibers 124F may be interweaved with the at least one attachment reinforcement component 120 and the at least one gas path reinforcement component 122 as shown in FIG. 3 by a number of techniques. In one example, the through thickness fibers 124F may be stitched to the component 120, 122 such that the fibers 124F extend generally in the direction D2'. In that case, one or more individual fiber tows placed in a predetermined orientation, loose fibers, multiple tows grouped through twisting or other means, and/or interleaved individual plies made up of fibers may be stitched through the platform 116.

During operation of the gas turbine engine, coupling of the at least one attachment reinforcement component 120 to the at least one gas path reinforcement component 122 by the through thickness reinforcement 124 facilitates resistance to loads induced on the platform 116. When the turbine blade 110 rotates, centrifugal forces associated with interaction between the gas path gasses and the airfoil 114 may cause bending stresses to be induced on the blade 110. For example, such bending stresses may be induced on the platform 116 adjacent the blade transitional bends 134, 136. The coupling of the components 120, 122 by the through thickness reinforcement 124 largely transfers those bending stresses to the root 112 and/or the airfoil 114 without causing interlaminar transfer of shear forces between the components 120, 122 and the core fiber-reinforcement plies 118A, 118B. By minimizing shear forces between plies, the life of the turbine blade 110 is increased.

In some embodiments, rather than being formed separate from one another, the at least one attachment reinforcement component 120 and the at least one gas path reinforcement component 122 may be provided as a single component. In such embodiments, the at least one through thickness reinforcement 124 may be omitted depending on application.

Figure 4:
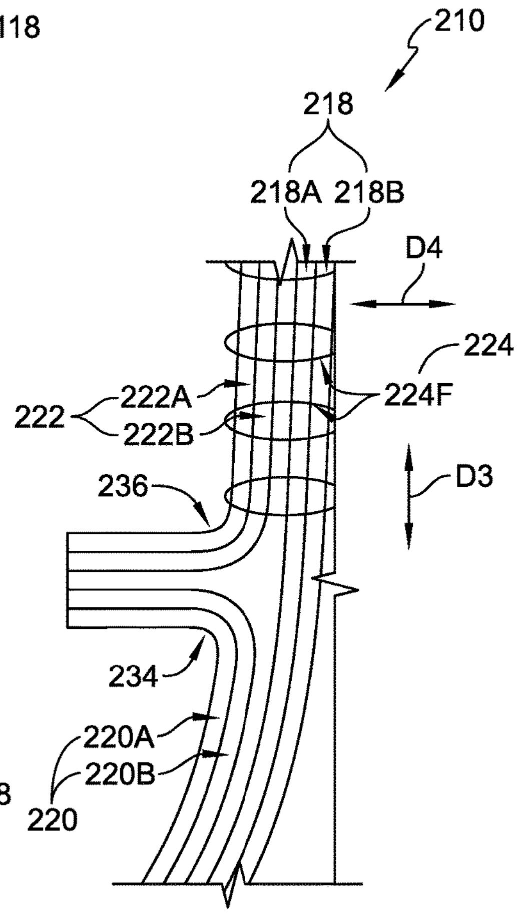
FIG. 4 is a partial cross-sectional view of yet another turbine blade similar to the turbine blade of FIG. 1 showing that the turbine blade includes at least one attachment reinforcement component that forms part of a root of the blade and an attachment side of a platform of the blade, at least one gas path reinforcement component that forms part of an airfoil of the blade and a gas path side of the platform, core fiber-reinforcement plies that form part of the root and the airfoil without forming part of the platform, and at least one through thickness reinforcement extending through the airfoil to secure the at least one gas path reinforcement component to the core fiber-reinforcement plies.

Referring now to FIG. 4, another turbine blade 210 adapted for use in a gas turbine engine is constructed of ceramic matrix composite material. The turbine blade 210 is similar to the turbine blade 10 in that the turbine blade 210 includes a root 212, an airfoil 214, and a platform 216 similar to the root 12, the airfoil 14, and the platform 16 of the blade 10. As such, similar features are designated in FIG. 1 with numerals corresponding to each of the blades 10, 210.

The root 212, the airfoil 214, and the platform 216 are illustratively formed using core fiber-reinforcement plies 218, at least one attachment reinforcement component 220 having ceramic-containing materials, at least one gas path reinforcement component 222 having ceramic-containing materials, and at least one through thickness reinforcement 224 as shown in FIG. 4. The core fiber-reinforcement plies 218 are disposed centrally within the turbine blade 210. The at least one attachment reinforcement component 220 is located at least in part at an attachment side 216A of the platform 216 facing the root 212 and forms part of the root 212. The at least one gas path reinforcement component 222 is located at least in part at a gas path side 216G of the platform 216 facing the airfoil 214 and forms part of the airfoil 214. The at least one through thickness reinforcement 224 extends generally perpendicular to the at least one gas path reinforcement component 222 and the core fiber-reinforcement plies 218 through the airfoil 214 to secure the component 222 to the plies 218.

In the illustrative embodiment, the ceramic matrix composite material used to make the turbine blade 210 includes silicon-carbide fibers in a silicon-carbide matrix. The core fiber-reinforcement plies 218, the at least one attachment reinforcement component 220, the at least one gas path reinforcement component 222, and the at least one through thickness reinforcement 224 may be co-processed in matrix material. In other embodiments, however, the turbine blade 210 may be constructed of other suitable composite materials depending on application.

Designs in accordance with the present disclosure incorporate at least one attachment reinforcement component 220 providing portions of both the root 212 and the platform 216 and at least one gas path reinforcement component 222 providing portions of both the airfoil 214 and the platform 216 as shown in FIGS. 1 and 4. Additionally, such designs incorporate at least one through thickness reinforcement 224 to secure the component 222 to the plies 218.

The illustrative core fiber-reinforcement plies 218 are arranged internal to the turbine blade 210 and extend from the root 212, past the platform 216, and through the airfoil 214 as shown in FIGS. 1 and 4. The core fiber-reinforcement plies 218 are configured to define the curvature of the airfoil 214 and provide central support for the airfoil 214 during operation of the gas turbine engine. The core fiber-reinforcement plies 218 form part of the root 212 and the airfoil 214 without forming part of the platform 216.

In the illustrative embodiment, the core fiber-reinforcement plies 218 include two core fiber-reinforcement plies 218A, 218B as shown in FIG. 4. In some embodiments, the core fiber-reinforcement plies 218A, 218B may be embodied as, or otherwise made from, two-dimensional woven fabrics. In other embodiments, the core fiber-reinforcement plies 218A, 218B may be embodied as, or otherwise made from, three-dimensional woven structures. In other embodiments still, the core fiber-reinforcement plies 218A, 218B may be embodied as, or otherwise made from, unidirectional monofilaments. In any case, another suitable number of core fiber-reinforcement plies 218 made from other suitable sheets of reinforcement may be employed.

In the illustrative embodiment, the at least one attachment reinforcement component 220 includes two attachment fiber-reinforcement plies 220A, 220B as shown in FIG. 4. The attachment fiber-reinforcement ply 220A is located at least in part at the attachment side 216A of the platform 216 to partially define the side 216A along with a blade transitional bend 234 defined between the root 212 and the platform 216. The attachment fiber-reinforcement ply 220B is located internal to the ply 220A. In the illustrative embodiment, the attachment fiber-reinforcement plies 220A, 220B are made from two-dimensional woven fabrics. In other embodiments, however, another suitable number of attachment fiber-reinforcement plies 220 made from other suitable sheets of reinforcement may be employed. In other embodiments still, rather than including the plies 220A, 220B, the component 220 may be embodied as, or otherwise include, a three-dimensional woven structure.

In the illustrative embodiment, the at least one gas path reinforcement component 222 includes two gas path fiber-reinforcement plies 222A, 222B as shown in FIG. 4. The gas path fiber-reinforcement ply 222A is located at least in part at the gas path side 216G of the platform 216 to partially define the side 216G along with a blade transitional bend 236 defined between the airfoil 214 and the platform 216. The gas path fiber-reinforcement ply 222B is located internal to the ply 222A. In the illustrative embodiment, the gas path fiber-reinforcement plies 222A, 222B are made from two-dimensional woven fabrics. In other embodiments, however, another suitable number of gas path fiber-reinforcement plies 222 made from other suitable sheets of reinforcement may be employed. In other embodiments still, rather than including the plies 222A, 222B, the reinforcement component 222 may be embodied as, or otherwise include, a three-dimensional woven structure.

In the illustrative embodiment, the at least one through thickness reinforcement 224 includes through thickness fibers 224F interwoven with the at least one gas path reinforcement component 222 and the core fiber-reinforcement plies 218 as shown in FIG. 4. Specifically, the through thickness fibers 224F are interwoven with the portions of the component 222 and the plies 218 extending generally in a direction D3 such that the fibers 224F extend generally in a direction D4 perpendicular to the direction D3. The through thickness fibers 224F are spaced apart in the direction D3.

The through thickness fibers 224F may be interweaved with the at least one gas path reinforcement component 222 and the core fiber-reinforcement plies 218 as shown in FIG. 4 by a number of techniques. In one example, the through thickness fibers 224F may be stitched to the component 222 and the plies 218 such that the fibers 224F extend generally in the direction D4. In that case, one or more individual fiber tows placed in a predetermined orientation, loose fibers, multiple tows grouped through twisting or other means, and/or interleaved individual plies made up of fibers may be stitched through the airfoil 214. In another example, the through thickness fibers 224F may be manually tied to the component 222 and the plies 218 such that the fibers 224F extend generally in the direction D4. In that case, the through thickness fibers 224F may be embodied as, or otherwise include, monofilament ceramic fibers such as SCS-Ultra silicon carbide fibers or SCS-6 silicon carbide fibers.

During operation of the gas turbine engine, coupling of the at least one gas path reinforcement component 222 to the core fiber-reinforcement plies 218 by the through thickness reinforcement 224 facilitates resistance to loads induced on the blade 210. When the turbine blade 210 rotates, centrifugal forces associated with interaction between the gas path gasses and the airfoil 214 may cause bending stresses to be induced on the blade 210. For example, such bending stresses may be induced on the platform 216 adjacent the blade transitional bends 234, 236. The coupling of the component 222 and the plies 218 by the through thickness reinforcement 224 largely transfers those bending stresses to the root 212 and/or the airfoil 214 without causing interlaminar transfer of shear forces between the plies 220A, 220B and the plies 222A, 222B. By minimizing shear forces between plies, the life of the turbine blade 210 is increased.

Figure 5:
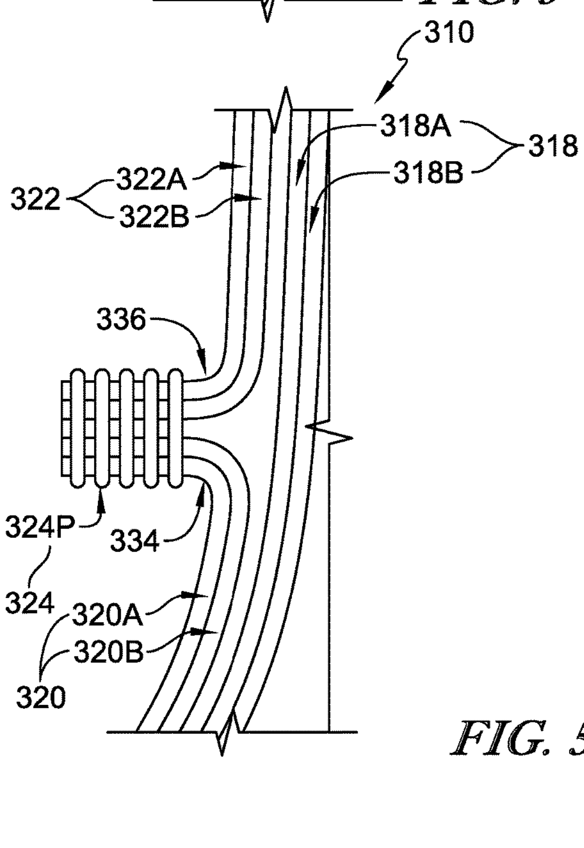
FIG. 5 is a partial cross-sectional view of yet another turbine blade still similar to the turbine blade of FIG. 1 showing that the turbine blade includes at least one attachment reinforcement component that forms part of a root of the blade and an attachment side of a platform of the blade, at least one gas path reinforcement component that forms part of an airfoil of the blade and a gas path side of the platform, and through thickness pins extending from the attachment side of the platform to the gas path side of the platform to secure the at least one attachment reinforcement component to the at least one gas path reinforcement component.

Referring now to FIG. 5, another turbine blade 310 adapted for use in a gas turbine engine is constructed of ceramic matrix composite material. The turbine blade 310 is similar to the turbine blade 10 in that the turbine blade 310 includes a root 312, an airfoil 314, and a platform 316 similar to the root 12, the airfoil 14, and the platform 16 of the blade 10. As such, similar features are designated in FIG. 1 with numerals corresponding to each of the blades 10, 310.

The root 312, the airfoil 314, and the platform 316 are illustratively formed using core fiber-reinforcement plies 318, at least one attachment reinforcement component 320 having ceramic-containing materials, at least one gas path reinforcement component 322 having ceramic-containing materials, and at least one through thickness reinforcement 324 as shown in FIG. 5. The core fiber-reinforcement plies 318 are disposed centrally within the turbine blade 310. The at least one attachment reinforcement component 320 is located at least in part at an attachment side 316A of the platform 316 facing the root 312 and forms part of the root 312. The at least one gas path reinforcement component 322 is located at least in part at a gas path side 316G of the platform 316 facing the airfoil 314 and forms part of the airfoil 314. The at least one through thickness reinforcement 324 extends generally perpendicular to each of the at least one attachment reinforcement component 320 and the at least one gas path reinforcement component 322 between the sides 316A, 316G of the platform 316 to secure the components 320, 322 to one another.

In the illustrative embodiment, the ceramic matrix composite material used to make the turbine blade 310 includes silicon-carbide fibers in a silicon-carbide matrix. The core fiber-reinforcement plies 318, the at least one attachment reinforcement component 320, the at least one gas path reinforcement component 322, and the at least one through thickness reinforcement 324 may be co-processed in matrix material. In other embodiments, however, the turbine blade 310 may be constructed of other suitable composite materials depending on application.

Designs in accordance with the present disclosure incorporate at least one attachment reinforcement component 320 providing portions of both the root 312 and the platform 316 and at least one gas path reinforcement component 322 providing portions of both the airfoil 314 and the platform 316 as shown in FIGS. 1 and 5. Additionally, such designs incorporate at least one through thickness reinforcement 324 to secure the components 320, 322 to one another.

The illustrative core fiber-reinforcement plies 318 are arranged internal to the turbine blade 310 and extend from the root 312, past the platform 316, and through the airfoil 314 as shown in FIGS. 1 and 5. The core fiber-reinforcement plies 318 are configured to define the curvature of the airfoil 314 and provide central support for the airfoil 314 during operation of the gas turbine engine. The core fiber-reinforcement plies 318 form part of the root 312 and the airfoil 314 without forming part of the platform 316.

In the illustrative embodiment, the core fiber-reinforcement plies 318 include two core fiber-reinforcement plies 318A, 318B as shown in FIG. 5. In some embodiments, the core fiber-reinforcement plies 318A, 318B may be embodied as, or otherwise made from, two-dimensional woven fabrics. In other embodiments, the core fiber-reinforcement plies 318A, 318B may be embodied as, or otherwise made from, three-dimensional woven structures. In other embodiments still, the core fiber-reinforcement plies 318A, 318B may be embodied as, or otherwise made from, unidirectional monofilaments. In any case, another suitable number of core fiber-reinforcement plies 318 made from other suitable sheets of reinforcement may be employed.

In the illustrative embodiment, the at least one attachment reinforcement component 320 includes two attachment fiber-reinforcement plies 320A, 320B as shown in FIG. 5. The attachment fiber-reinforcement ply 320A is located at least in part at the attachment side 316A of the platform 316 to partially define the side 316A along with a blade transitional bend 334 defined between the root 312 and the platform 316. The attachment fiber-reinforcement ply 320B is located internal to the ply 320A. In the illustrative embodiment, the attachment fiber-reinforcement plies 320A, 320B are made from two-dimensional woven fabrics. In other embodiments, however, another suitable number of attachment fiber-reinforcement plies 320 made from other suitable sheets of reinforcement may be employed. In other embodiments still, rather than including the plies 320A, 320B, the component 320 may be embodied as, or otherwise include, a three-dimensional woven structure.

In the illustrative embodiment, the at least one gas path reinforcement component 322 includes two gas path fiber-reinforcement plies 322A, 322B as shown in FIG. 5. The gas path fiber-reinforcement ply 322A is located at least in part at the gas path side 316G of the platform 316 to partially define the side 316G along with a blade transitional bend 336 defined between the airfoil 314 and the platform 316. The gas path fiber-reinforcement ply 322B is located internal to the ply 322A. In the illustrative embodiment, the gas path fiber-reinforcement plies 322A, 322B are made from two-dimensional woven fabrics. In other embodiments, however, another suitable number of gas path fiber-reinforcement plies 322 made from other suitable sheets of reinforcement may be employed. In other embodiments still, rather than including the plies 322A, 322B, the reinforcement component 322 may be embodied as, or otherwise include, a three-dimensional woven structure.

In the illustrative embodiment, the at least one through thickness reinforcement 324 includes through thickness pins 324P extending from the attachment side 316A of the platform 316 to the gas path side 316G of the platform 316 as shown in FIGS. 1 and. 5. Specifically, the through thickness pins 324P extend from the side 316A to the side 316G perpendicular to the attachment and gas path reinforcement components 320, 322 to secure the attachment fiber-reinforcement plies 320A, 320B to the gas path fiber-reinforcement plies 322A, 322B.

During operation of the gas turbine engine, coupling of the attachment fiber-reinforcement plies 320A, 320B to the gas path fiber-reinforcement plies 322A, 322B by the through thickness reinforcement 324 facilitates resistance to loads induced on the blade 310. When the turbine blade 310 rotates, centrifugal forces associated with interaction between the gas path gasses and the airfoil 314 may cause bending stresses to be induced on the blade 310. For example, such bending stresses may be induced on the platform 316 adjacent the blade transitional bends 334, 336. The coupling of the plies 320A, 320B and the plies 322A, 322B by the through thickness reinforcement 324 largely transfers those bending stresses to the root 312 and/or the airfoil 314 without causing interlaminar transfer of shear forces between the plies 320A, 320B and the plies 322A, 322B. By minimizing shear forces between plies, the life of the turbine blade 310 is increased.

Ceramic matrix composite material (CMC) may withstand higher temperatures than traditional metal alloys. As such, CMC may be desirable in gas turbine engines where higher fuel efficiencies may be attained at higher temperatures. Because turbine sections of gas turbine engines in particular experience high temperatures, CMC may be beneficial in those sections. CMC material may also be less dense than metal, thereby enabling the use of lighter engine components to promote fuel efficiency. The lower density of CMC may be desirable in a turbine blade (e.g., the blades 10, 110, 210, 310) because lighter turbine blades may allow for a weight reduction in the turbine wheel or disc.

The present disclosure may provide a method for designing and manufacturing a CMC turbine blade platform (e.g., the platforms 16, 116, 216, 316). Specifically, the present disclosure may provide a method for designing and manufacturing a CMC turbine blade platform that omits stiffening blocks and reduces the overall weight of the component compared to other configurations.

In one example, the turbine blade (i.e., the blade 10) may include a plurality of two-dimensional woven plies (e.g., the gas path fiber-reinforcement plies 22) extending radially inward from a tip of the blade to form the airfoil shape (e.g., the airfoil 14) before turning to form the upper or flowpath side (e.g., the gas path side 16G) of the platform. The blade may include a plurality of two-dimensional woven plies (e.g., the attachment fiber-reinforcement plies 20) extending radially outward from a hub (e.g., the attachment section 32) to form a shank (e.g., the shank section 30) before turning to form the lower portion of the platform (e.g., the attachment side 16A). The blade may include a core (e.g., the core fiber-reinforcement plies 18) made from two-dimensional woven cloth, three-dimensional woven preform, unidirectional monofilament, or a combination thereof. To strengthen and reinforce the platform, fibers (e.g., the through thickness fibers 24F) may be inserted perpendicular to the two-dimensional woven plies that form the upper and lower portions of the platform. The fibers may be inserted by stitching, punching, automated direct, or manual means. In the case of stitching, a standard fiber tow may be sewn or stitched through the platform. In the case of manual insertion, large diameter fibers such as ceramic monofilament fibers (e.g., SCS-6 or SCS-Ultra) may be inserted into the matrix.

In another example, a turbine blade (e.g., the blade 110) may include three-dimensional woven structures (e.g., the attachment reinforcement component and gas path reinforcement components 120, 122) in place of the outer two-dimensional woven plies. In yet another example, a turbine blade (e.g., the blade 210) may include two-dimensional woven plies or three-dimensional woven structures. In that example, the turbine blade may include monofilament (e.g., the through thickness fibers 224F) inserted through the airfoil (e.g., the airfoil 214) to tie the surface plies (e.g., the gas path fiber-reinforcement plies 222A, 222B) to the core (e.g., the core fiber-reinforcement plies 218). Again, in that example, the fibers may be stitched or manually inserted through the airfoil, and that configuration may be employed in a standard two-dimensional layup of a blade or vane.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade of ceramic matrix composite material construction adapted for use in a gas turbine engine, the turbine blade comprising a root adapted to attach the turbine blade to a disk, an airfoil shaped to interact with hot gasses moving through the gas path of a gas turbine engine and cause rotation of the turbine blade when the turbine blade is used in a gas turbine engine, and a platform having an attachment side facing the root and a gas path side facing the airfoil, the platform arranged between the root and the airfoil and shaped to extend outwardly from the root and the airfoil in order to block migration of gasses from the gas path toward the root when the turbine blade is used in a gas turbine engine, wherein the turbine blade includes at least one attachment fiber-reinforcement ply having a first section that forms part of the root and a second section that extends in a first direction away from the root to form part of the attachment side of the platform, at least one gas path fiber-reinforcement ply having a first section that forms part of the airfoil and a second section that extends in the first direction away from the airfoil to form part of the gas path side of the platform, and at least one through thickness reinforcement that extends in a second direction perpendicular to the first direction through the second section of the at least one attachment fiber-reinforcement ply and the second section of the at least one gas path fiber-reinforcement ply to secure the at least one attachment fiber-reinforcement ply to the at least one gas path fiber-reinforcement ply to facilitate resistance to loads induced on the platform when the turbine blade is used in a gas turbine engine.

2. The turbine blade of claim 1, wherein the at least one through thickness reinforcement includes through thickness fibers interwoven with the at least one attachment fiber-reinforcement ply and the at least one gas path fiber-reinforcement ply.

3. The turbine blade of claim 2, wherein the through thickness fibers are stitched to the at least one attachment fiber-reinforcement ply and the at least one gas path fiber-reinforcement ply such that the through thickness fibers extend in the second direction.

4. The turbine blade of claim 2, wherein the through thickness fibers are punched to the at least one attachment fiber-reinforcement ply and the at least one gas path fiber-reinforcement ply such that the through thickness fibers extend in the second direction.

5. The turbine blade of claim 2, wherein the through thickness fibers are manually tied to the at least one attachment fiber-reinforcement ply and the at least one gas path fiber-reinforcement ply such that the through thickness fibers extend in the second direction.

6. The turbine blade of claim 5, wherein the through thickness fibers include monofilament ceramic fibers.

7. The turbine blade of claim 6, wherein the monofilament ceramic fibers include SCS-Ultra silicon carbide fibers or SCS-6 silicon carbide fibers.

8. A turbine blade comprising a root adapted to attach the turbine blade to a disk, an airfoil aerodynamically shaped to interact with gasses, and a platform having an attachment side facing the root and a gas path side facing the airfoil, the platform arranged between the root and the airfoil and shaped to extend outwardly from the root and the airfoil, wherein the turbine blade includes at least one attachment reinforcement component comprising ceramic-containing materials and having a first section that forms part of the root and a second section that extends in a first direction away from the root to form at least part of the attachment side of the platform and at least one gas path reinforcement component comprising ceramic-containing materials and having a first section that forms part of the airfoil and a second section that extends in the first direction away from the airfoil to form at least part of the gas path side of the platform, wherein the at least one attachment reinforcement component and the at least one gas path reinforcement component are three-dimensional woven structures, wherein the turbine blade further includes at least one through thickness reinforcement that extends perpendicular to the second section of the at least one attachment reinforcement component and the second section of the at least one gas path reinforcement component between the attachment path side and the gas path side of the platform to secure the at least one attachment reinforcement component to the at least one gas path reinforcement component, and wherein the at least one through thickness reinforcement includes through thickness fibers stitched to the at least one attachment reinforcement component and the at least one gas path reinforcement component.

9. The turbine blade of claim 8, further comprising core fiber-reinforcement plies that form part of the root and the airfoil without forming part of the platform, wherein the core fiber-reinforcement plies are made from two-dimensional woven fabrics.

10. The turbine blade of claim 9, further comprising at least one through thickness reinforcement extending perpendicular to the at least one gas path reinforcement component and the core fiber-reinforcement plies through the airfoil to secure the at least one gas path reinforcement component to the core fiber-reinforcement plies.

11. The turbine blade of claim 10, wherein the at least one through thickness reinforcement includes through thickness fibers stitched to the at least one gas path reinforcement component and the core fiber-reinforcement plies.

12. A turbine blade comprising a root adapted to attach the turbine blade to a disk, an airfoil aerodynamically shaped to interact with gasses, and a platform having an attachment side facing the root and a gas path side facing the airfoil, the platform arranged between the root and the airfoil and shaped to extend outwardly from the root and the airfoil, wherein the turbine blade includes at least one attachment reinforcement component comprising ceramic-containing materials and having a first section that forms part of the root and a second section that extends in a first direction away from the root to form at least part of the attachment side of the platform and at least one gas path reinforcement component comprising ceramic-containing materials and having a first section that forms part of the airfoil and a second section that extends in the first direction away from the airfoil to form at least part of the gas path side of the platform, and at least one through thickness reinforcement that extends in a second direction perpendicular to each of the second section of the at least one attachment reinforcement component and the second section of the at least one gas path reinforcement component to secure the at least one attachment reinforcement component to the at least one gas path reinforcement component.

13. The turbine blade of claim 12, wherein the at least one attachment reinforcement component includes attachment fiber-reinforcement plies made from two-dimensional woven fabrics.

14. The turbine blade of claim 13, wherein the at least one gas path reinforcement component includes gas path fiber-reinforcement plies made from two-dimensional woven fabrics.

15. The turbine blade of claim 12, wherein the at least one attachment reinforcement component is a three-dimensional woven structure.

16. The turbine blade of claim 15, wherein the at least one gas path reinforcement component is a three-dimensional woven structure.

17. The turbine blade of claim 15, wherein the at least one through thickness reinforcement extends through the second section of the at least one attachment fiber-reinforcement ply and the second section of the at least one gas path fiber-reinforcement ply.

18. The turbine blade of claim 12, wherein the at least one through thickness reinforcement has a surface area equal to the at least one gas path reinforcement component.

19. The turbine blade of claim 12, wherein the at least one through thickness reinforcement has a surface area greater than the at least one gas path reinforcement component.

* * * * *